United States Patent
Liao et al.

(10) Patent No.: US 11,834,576 B2
(45) Date of Patent: Dec. 5, 2023

(54) UNSATURATED POLYESTER RESIN COMPOSITION AND MOLDED ARTICLE THEREOF

(71) Applicant: NAN YA PLASTICS CORPORATION, Taipei (TW)

(72) Inventors: Te-Chao Liao, Taipei (TW); Sen-Huang Hsu, Taipei (TW); Chung-Chi Su, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 226 days.

(21) Appl. No.: 17/385,918

(22) Filed: Jul. 27, 2021

(65) Prior Publication Data

US 2022/0127453 A1 Apr. 28, 2022

(30) Foreign Application Priority Data

Oct. 26, 2020 (TW) ................. 109137015

(51) Int. Cl.
| | |
|---|---|
| *C08L 67/06* | (2006.01) |
| *C08G 63/183* | (2006.01) |
| *C08G 63/21* | (2006.01) |
| *C08F 12/08* | (2006.01) |
| *C08F 220/20* | (2006.01) |
| *C08F 220/10* | (2006.01) |
| *C08F 222/10* | (2006.01) |

(52) U.S. Cl.
CPC ............ *C08L 67/06* (2013.01); *C08F 12/08* (2013.01); *C08F 220/20* (2013.01); *C08F 222/102* (2020.02); *C08G 63/183* (2013.01); *C08G 63/21* (2013.01); *C08L 2201/08* (2013.01); *C08L 2203/30* (2013.01)

(58) Field of Classification Search
CPC . C08J 5/24; C08J 7/047; C08J 2301/02; C08J 2461/24; C08J 2205/16; C08J 2479/08; C08J 2479/02; C08J 2429/14; C08J 2433/04; C08L 1/02; C08L 2205/03; C08L 67/06; C08L 2203/30; C08L 2201/08; C08G 63/183; C08G 63/21; C08F 220/20; C08F 222/102; C08F 12/08
See application file for complete search history.

(56) References Cited

FOREIGN PATENT DOCUMENTS

| | | | |
|---|---|---|---|
| CN | 1324373 A | 11/2001 | |
| CN | 101490118 B | 4/2013 | |
| EP | 4019571 A1 * | 6/2022 | ............ C08J 5/042 |
| KR | 10-0682711 * | 2/2007 | ............ G03F 7/004 |

* cited by examiner

*Primary Examiner* — Robert D Harlan
(74) *Attorney, Agent, or Firm* — Li & Cai Intellectual Property Office

(57) ABSTRACT

An unsaturated polyester resin composition with low styrene volatility and a molding article thereof are provided. The unsaturated polyester resin composition of includes: 30 to 60 parts by weight of unsaturated polyester resin and 2 to 30 parts by weight of comonomer, and the comonomer includes: (a) methyl styrene, (b) hydroxy acrylate monomer and (c) diallyl phthalate monomer, and the weight ratio of the content (a), (b), and (c) is 6:3:1 in the comonomer.

7 Claims, No Drawings

UNSATURATED POLYESTER RESIN COMPOSITION AND MOLDED ARTICLE THEREOF

CROSS-REFERENCE TO RELATED PATENT APPLICATION

This application claims the benefit of priority to Taiwan Patent Application No. 109137015, filed on Oct. 26, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an unsaturated polyester resin composition and a molded article thereof, and more particularly to an unsaturated polyester resin composition with low styrene volatilization and a molded article thereof.

BACKGROUND OF THE DISCLOSURE

An unsaturated polyester resin is obtained by an esterification reaction of dihydric alcohol and dibasic acid at between 190 and 220° C. After the esterification reaction reaches the expected acid value (or viscosity), the reactant is diluted and dissolved with a certain amount of styrene monomer to form a viscous liquid, that is, the unsaturated polyester resin. The curing and molding of the unsaturated polyester resin can be performed under room temperature and normal pressure. The cured product of the unsaturated polyester resin can omit the heating devices, and has good mechanical strength and electrical properties, excellent acid corrosion resistance, weather resistance, and water resistance. Accordingly, the unsaturated polyester resin is widely used in injection molding, sheet molding compound (SMC) or block molding compound (BMC) manufacturing processes, and various plastic industry products.

The molecular chain of the unsaturated polyester resin contains double bonds, and can be copolymerized with monomers with double bonds to form a three-dimensional structure, so that the unsaturated polyester resin has excellent mechanical properties and chemical corrosion resistance. Generally, in the conventional art, styrene is a diluent and comonomer of the unsaturated polyester resin, and the amount of the styrene is as much as 30 to 40 wt % based on the total resin. However, due to the styrene having a low boiling point, being easily volatilized, having high vapor pressure at room temperature, and having a special odor and toxicity, it brings great harm to the health of field operators and the environment. Therefore, developing the unsaturated polyester resin with low styrene has become one of the important issues to be solved in this field.

SUMMARY OF THE DISCLOSURE

In response to the above-referenced technical inadequacy, the present disclosure provides an unsaturated polyester resin composition with low styrene volatilization.

In one aspect, the present disclosure provides an unsaturated polyester resin composition, based on a total weight of the unsaturated polyester resin composition being 100 weight percent, the unsaturated polyester resin composition including: 30 to 60 parts by weight of unsaturated polyester resin and 2 to 30 parts by weight of comonomer; in which, the comonomer includes: (a) methylstyrene, (b) hydroxy acrylate monomer and (c) diallyl phthalate monomer, and based on a total weight of the comonomer, the weight ratio of the content of (a), (b), and (c) is 6:3:1.

In certain embodiments, a styrene content of the unsaturated polyester resin composition is less than 5 wt %.

In certain embodiments, the unsaturated polyester resin is selected from the group consisting of phthalic acid type unsaturated polyester, isophthalic acid type unsaturated polyester and terephthalic acid type unsaturated polyester.

In certain embodiments, the hydroxy acrylate monomer is selected from the group consisting of hydroxyethyl acrylate, hydroxyethyl methacrylate, hydroxypropyl acrylate, hydroxypropyl methacrylate, 4-hydroxybutyl acrylate, and pentaerythritol triacrylate.

In certain embodiments, the diallyl phthalate monomer is selected from the group consisting of diallyl phthalate and diallyl isophthalate.

In certain embodiments, based on a total weight of the unsaturated polyester resin and the comonomer, the content of the comonomer is between 5 and 20 wt %.

In another aspect, the present disclosure provides a molded article formed by heating and curing the unsaturated polyester resin composition of the present disclosure.

Therefore, by virtue of "the comonomer including: (a) methylstyrene, (b) hydroxy acrylate monomer and (c) diallyl phthalate monomer" and "based on a total weight of the comonomer, the weight ratio of the content of (a), (b), and (c) being 6:3:1", the present disclosure provides an unsaturated polyester resin composition with low styrene volatilization.

These and other aspects of the present disclosure will become apparent from the following description of the embodiment, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides an unsaturated polyester resin composition, based on a total weight of the unsaturated polyester resin composition being 100 weight percent, the unsaturated polyester resin composition includes 30 to 60 parts by weight of unsaturated polyester resin and 2 to 30 parts by weight of comonomer. The comonomer includes: (a) methylstyrene, (b) hydroxy acrylate monomer and (c) diallyl phthalate monomer, and based on a total weight of the comonomer, the weight ratio of the content of (a), (b), and (c) is 6:3:1.

Preferably, the weight ratio of the unsaturated polyester resin to comonomer is from 4:1 to 7:1.

Specifically, the unsaturated polyester resin is selected from the group consisting of phthalic acid type unsaturated polyester, isophthalic acid type unsaturated polyester and terephthalic acid type unsaturated polyester. Preferably, the degree of polymerization of the unsaturated polyester resin is 2 to 8, and the viscosity at 25° C. is 5000 to 30000 cps.

More specifically, the hydroxy acrylate monomer is selected from the group consisting of hydroxyethyl acrylate, hydroxyethyl methacrylate, hydroxypropyl acrylate, hydroxypropyl methacrylate, 4-hydroxybutyl acrylate, and pentaerythritol triacrylate.

In detail, the diallyl phthalate monomer is selected from the group consisting of diallyl phthalate and diallyl isophthalate.

Preferably, based on a total weight of the unsaturated polyester resin and the comonomer, the content of the comonomer is between 5 and 20 wt %. Specifically, the comonomer of the present disclosure has a higher boiling point, a low vapor pressure at room temperature, and is not easy to volatilize, so that it can improve production conditions due to having less volatile organic compounds (VOC), and further prevent health risk of operators and reduce environmental pollution.

In addition, the conventional unsaturated polyester resin has a large volume shrinkage rate during curing process, which affects the size and surface gloss of the molded article thereof. The comonomer of the present disclosure can effectively improve this problem without affecting other physical properties.

Further, the unsaturated polyester resin composition can include fillers, such as glass fiber, asbestos fiber, carbon fiber, boron fiber, mica, silica, talc, silicate, calcium carbonate, metal oxide and carbon black, so as to increase its mechanical strength.

Optionally, the unsaturated polyester resin composition can further include other general resin additives, for example, ultraviolet absorbers (benzophenone-based compound, benzotriazole-based compound, cyanoacrylate-based compound, triazine-based compound and salicylate-based compound, etc.), light stabilizers (hindered amine compound, etc.), antioxidants (hindered phenol compound, amine compound, copper compound, organic phosphorus peroxide decomposers, organic sulfur peroxide decomposers, etc.), opacifier (rutile-type titanium oxide, chromium oxide, cerium oxide, etc.), metal deactivators (benzotriazole-based compound, etc.), matting agents (organic nickel, etc.), natural wax, synthetic wax, higher fatty acids, metallic salts of higher fatty acids, antifogging agent, antifungal agent, antibacterial agent, deodorant, plasticizer, antistatic agent, surfactant, polymerization inhibitor, crosslinking agent, dye, coloring agent (carbon black, titanium oxide, red iron oxide and other pigments, dyes, etc.), sensitizer, hardening accelerator, diluent, fluidity regulator, antifoamer, foaming agent, levelling agents, binder, adhesive, viscosity imparting agent, slip agent, mold releasing agent, lubricants, solid lubricants (polytetrafluoroethylene, polyolefin resin such as low-density polyethylene, linear low-density polyethylene, medium-density polyethylene, high-density polyethylene, and ultra high molecular weight polyethylene (UHMWPE), etc., and graphite, molybdenum disulfide, tungsten disulfide, boron nitride, etc.), nuclear agent, strengthening agent, compatibilizer, conductive material (carbon-based, metal-based, metal oxide-based, etc.), anti-blocking agent, anti-tracking agent, light storage agent, various stabilizers, etc. However, the aforementioned examples are merely an example and are not meant to limit the scope of the present disclosure.

Any conditions for synthesizing the unsaturated polyester resin composition of the present disclosure are required to be appropriately arranged according to the materials or the amount. In general, the synthesis of the unsaturated polyester resin composition is by carrying out esterification reaction with compression or decompression under an inert gas stream such as nitrogen and at a temperature of 140 to 230° C. In the esterification reaction, an esterification catalyst can be added optionally. Examples of the catalyst include well-known catalysts such as manganese acetate, dibutyltin oxide, stannous oxalate, zinc acetate and cobalt acetate, etc., and the catalysts can be used alone or in combination.

The present disclosure further provides a molded article formed by heating and curing the unsaturated polyester resin composition of the present disclosure. In other words, the unsaturated polyester resin composition of the present disclosure can be molded from the aforementioned composition into SMC (sheet molding compound), TMC (thick molding compound) or BMC (bulk molding compound) by using the conventional mixing and dipping method.

The molded article of the unsaturated polyester resin composition of the present disclosure can be manufactured by heating and molding the unsaturated polyester resin composition at a predetermined temperature and a predetermined pressure in a compression molding machine or an injection molding machine. For example, the unsaturated polyester resin composition is cured at a pressure from 1 to 12 MPa and a temperature from 80 to 160° C.

EMBODIMENTS

The present disclosure is further illustrated through the following examples. The compositions and contents of the embodiments are as shown in Table 1. Each embodiment of the unsaturated polyester resin composition is uniformly mixed to form a sheet mixture.

TABLE 1

|  | Embodiment 1 | Embodiment 2 | Embodiment 3 |
| --- | --- | --- | --- |
| O-phthalic acid unsaturated polyester resin | 40 wt % | — | — |
| I-phthalic acid unsaturated | — | 35 wt % | — |

TABLE 1-continued

|  | Embodiment 1 | Embodiment 2 | Embodiment 3 |
|---|---|---|---|
| polyester resin |  |  |  |
| T-phthalic acid unsaturated polyester resin | — | — | 35 wt % |
| Hydroxyethyl acrylate | 3 wt % | — | — |
| 4-Hydroxybutyl acrylate | — | 1.5 wt % | — |
| 2-Hydroxypropyl methacrylate | — | — | 1.5 wt % |
| Methylstyrene | 6 wt % | 3 wt % | 3 wt % |
| Diallyl phthalate | 1 wt % | — | — |
| Diallyl isophthalate | — | 0.5 wt % | 0.5 wt % |
| Filler (calcium carbonate) | 30 wt % | 35 wt % | 35 wt % |
| Glass fiber | 15 wt % | 20 wt % | 20 wt % |
| Slip agent | 5 wt % | 5 wt % | 5 wt % |

Result

The unsaturated polyester resin composition mixture of the present disclosure can be molded to provide a molded article by a compression or injection molding machine at a temperature from 80 to 160° C. and a pressure from 10 to 120 kgf/cm². Physical properties of the molded articles are further tested according to the following manners, and the test results are recorded in Table 2.

TABLE 2

|  | Embodiment 1 | Embodiment 2 | Embodiment 3 |
|---|---|---|---|
| Shrinkage (%) | 0.001 | 0.03 | 0.05 |
| Surface roughness (μm) | 15 | 20 | 35 |
| BARCOL hardness (Standard: 45-50) | 50 | 48 | 45 |

Beneficial Effects of the Embodiments

In conclusion, by virtue of "the comonomer including: (a) methylstyrene, (b) hydroxy acrylate monomer and (c) diallyl phthalate monomer" and "based on a total weight of the comonomer, the weight ratio of the content of (a), (b), and (c) being 6:3:1", the present application provides an unsaturated polyester resin composition with low styrene volatilization. More specifically, the unsaturated polyester resin still contains a small amount of styrene monomer (SM), the composition of the present disclosure can effectively reduce the styrene content of the unsaturated polyester resin composition to be less than 5 wt %.

Furthermore, the comonomer of the present disclosure has a high boiling point, low vapor pressure at room temperature, low volatility, and low content of volatile organic compounds (VOC), so that the present disclosure can improve production conditions, prevent health risk of operators and reduce environmental pollution.

In addition, the conventional unsaturated polyester resin has a large volume shrinkage rate during curing process, which affects the size and surface gloss of the molded article thereof. The comonomer of the present disclosure can effectively improve on this issue without affecting other physical properties and provide the unsaturated polyester resin composition that has low shrinkage rate.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical disclosure so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An unsaturated polyester resin composition, based on a total weight of the unsaturated polyester resin composition being 100 weight percent, the unsaturated polyester resin composition comprising:
   30 to 60 parts by weight of unsaturated polyester resin; and
   2 to 30 parts by weight of comonomer, comprising:
   (a) methylstyrene;
   (b) hydroxy acrylate monomer; and
   (c) diallyl phthalate monomer;
   wherein, based on a total weight of the comonomer, the weight ratio of the content of (a), (b), and (c) is 6:3:1, respectively.

2. The unsaturated polyester resin composition according to claim 1, wherein the comonomer comprises methylstyrene, and a styrene content of the unsaturated polyester resin composition is less than 5 wt %.

3. The unsaturated polyester resin composition according to claim 1, wherein the unsaturated polyester resin is selected from the group consisting of phthalic acid unsaturated polyester, isophthalic acid unsaturated polyester and terephthalic acid unsaturated polyester.

4. The unsaturated polyester resin composition according to claim 1, wherein the hydroxy acrylate monomer is selected from the group consisting of hydroxyethyl acrylate, hydroxyethyl methacrylate, hydroxypropyl acrylate, hydroxypropyl methacrylate, 4-hydroxybutyl acrylate, and pentaerythritol triacrylate.

5. The unsaturated polyester resin composition according to claim 1, wherein the diallyl phthalate monomer is selected from the group consisting of diallyl phthalate and diallyl isophthalate.

6. The unsaturated polyester resin composition according to claim 1, wherein based on a total weight of the unsaturated polyester resin and the comonomer, the content of the comonomer is between 5 and 20 wt %.

7. A molded article, formed by heating and curing the unsaturated polyester resin composition according to claim 1.

* * * * *